UNITED STATES PATENT OFFICE.

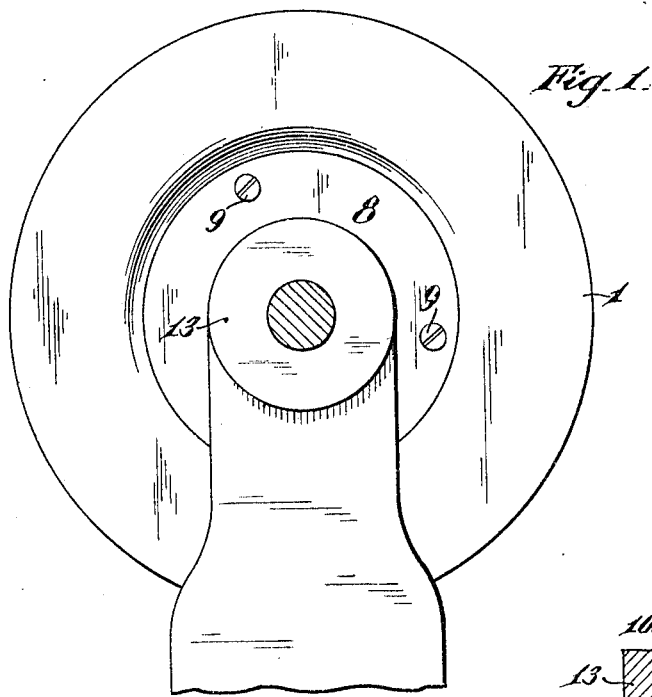
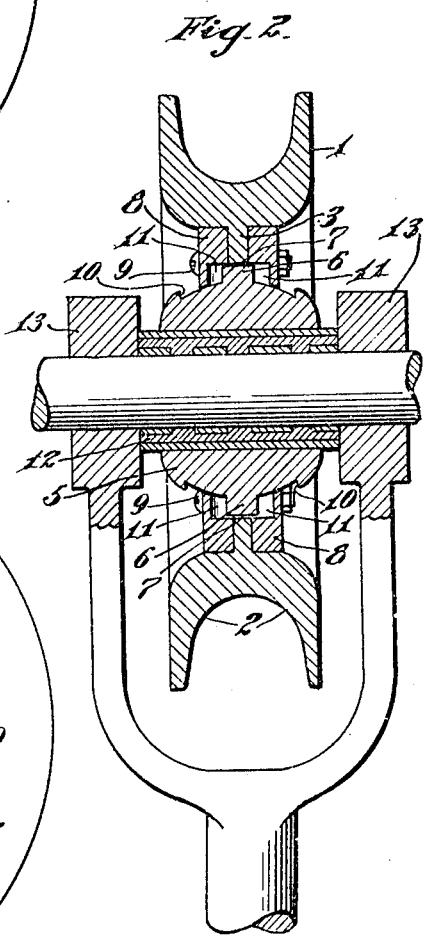
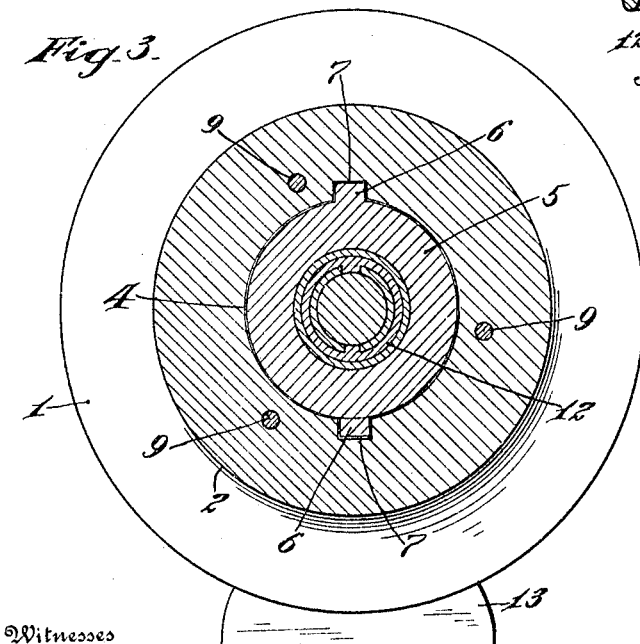

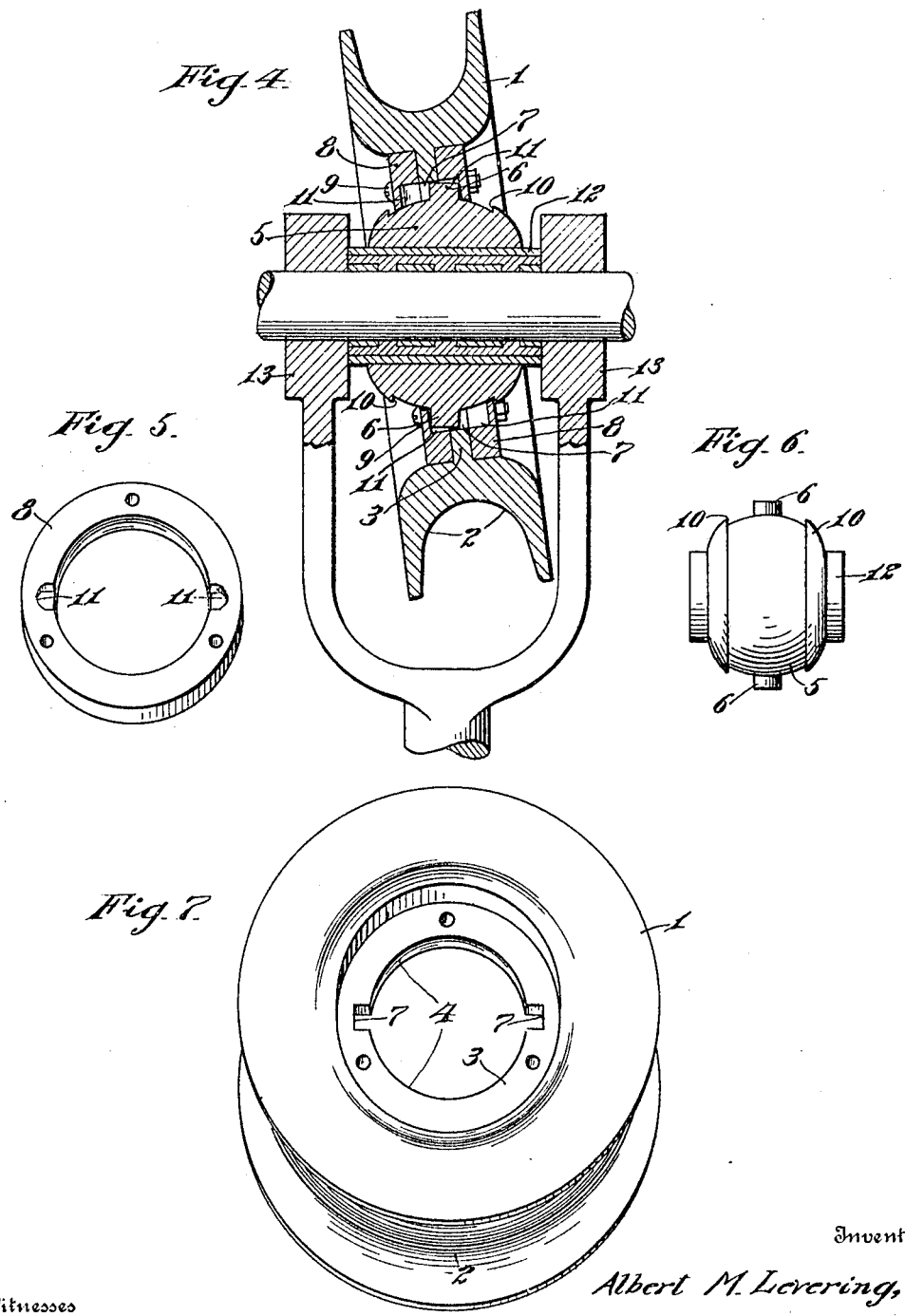

ALBERT M. LEVERING, OF PHILADELPHIA, PENNSYLVANIA.

TROLLEY-WHEEL.

954,312.

Specification of Letters Patent.  Patented Apr. 5, 1910.

Application filed April 3, 1909. Serial No. 487,718.

*To all whom it may concern:*

Be it known that I, ALBERT M. LEVERING, a citizen of the United States, residing at Philadelphia, in the county of Philadelphia and State of Pennsylvania, have invented certain new and useful Improvements in Trolley-Wheels, of which the following is a specification.

My invention relates to improvements in trolley wheels, the object of the invention being to provide an improved trolley wheel, which is capable of pivotal movement within certain limits, with relation to its journal, so that the wheel can easily follow the bends and curves of the wire, and not jump off the wire as is the case so frequently with trolley wheels in general use.

With these and other objects in view, the invention consists in certain novel features of construction, and combinations and arrangements of parts as will be more fully hereinafter described and pointed out in the claims.

In the accompanying drawings, Figure 1, is a view in side elevation illustrating my improvements. Fig. 2, is a view in cross section. Fig. 3, is a view in section at right angles to Fig. 2. Fig. 4, is a view similar to Fig. 2, showing the trolley tilted or tipped to one side, and Figs. 5, 6 and 7, are detail perspective views of the parts of the wheel.

1 represents the main portion of the trolley wheel, having the annular wire receiving groove 2 in its periphery, and made with a central web 3, the latter having a circular opening 4, to accommodate the hub 5, which latter is provided at opposite sides with lugs or pins 6, positioned in recesses 7 in the web 3, to compel the hub and wheel to always turn together, regardless of the angle to which the wheel may be tilted on the hub.

The hub 5 is curved in cross section, and forms in effect and within certain limits of movement, a universal joint. Rings 8 are secured to the outer faces of web 3 by means of screws, rivets, or other fastening devices 9, and these rings 8 are so curved in cross section at their inner edges, that in coöperation with the web 3, they constitute a wide curved bearing for the curved hub 5, and the latter is provided with integral annular flanges 10, at its opposite sides, which when the trolley wheel pivots or tilts on the hub, will engage the rings 8 and limit the pivotal or tilting movement.

The rings 8 are made with recesses 11, which are alined with the recesses 7 in the web 3, so that the lugs or pins 6 may move laterally in the wheel, or rather the wheel move laterally on the pins and allow for pivotal or tilting movement of the wheel, regardless of the position of the hub.

The diameter of the hub at its flanges 10 is just sufficient to allow the flange to pass through the opening 4 in web 3, and permit the rings 8 to be inserted over them. Owing to the fact, that the wheel more or less rides upwardly on the hub as it tilts, these flanges will engage the rings to limit the tilting movement, even though the flanged portions of the hub are of a diameter less than the internal diameter of the ring.

The hub 5 and the rings 8 are preferably of hardened steel or other hard metal, while the wheel 1 is preferably of bronze, brass or other suitable material, and of course I do not limit myself to any particular metal.

The hub 5 is provided with a bushing 12, such as ordinarily used in trolley wheels, and this bushing is mounted on a journal 13, in the ordinary fork of a trolley pole, the members of said fork being sufficiently far apart to allow for the necessary tilting movement of the wheel.

With my improvements in operation, the wheel is permitted a tilting movement within certain limits, to follow the many bends and twists of a trolley wire, and prevent jumping of the wheel from the wire, but it will be observed that the pins or lugs 6, will prevent any turning of the wheel on the hub, but will compel the wheel to always turn upon its bushing 12.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. A trolley wheel having an opening in its center, a hub in said opening, having its outer face curved in cross section, pins on said hub located in recesses in the wheel, rings secured to the opposite sides of the wheel and confining the pins, and flanges on said hub adapted to engage the ring and limit the pivotal movement of the wheel on the hub.

2. A trolley wheel having an opening in its center, and recesses communicating with said opening and disposed at diametrically opposite points, a hub having its outer face curved in cross section and appreciably wider than the central portion of the wheel, pins on said hub located in the recesses in the wheel, rings secured to opposite sides of the wheel, and having recesses registering with the recesses in the wheel, and annular flanges on said hub adapted to engage the rings and limit the pivotal movement of the wheel on the hub.

3. A trolley wheel having an opening in its center, rings secured on opposite sides of the wheel, and the inner faces of said rings and the wall of said opening coöperating to form a concaved bearing, a convex hub in said opening and rings, said wheel and rings having registering recesses, pins on the hub located in said recesses, and flanges on the hub adapted to engage the rings and limit the pivotal movement of the wheel on the hub.

In testimony whereof I have signed my name to this specification in the presence of two subscribing witnesses.

ALBERT M. LEVERING.

Witnesses:
J. A. L. MULHALL,
R. H. KRENKEL.